United States Patent
Payne et al.

(10) Patent No.: US 11,440,398 B2
(45) Date of Patent: Sep. 13, 2022

(54) MOTIVE WHEEL COMPRISING A SELECTIVELY ATTACHABLE AND DETACHABLE HUB MOTOR AND METHOD OF MAKING AND USING THE SAME

(71) Applicant: Toyota Motor Engineering & Manufacturing North America, Inc., Plano, TX (US)

(72) Inventors: Joshua D. Payne, Ann Arbor, MI (US); Nathan C. Westover, New Hudson, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 431 days.

(21) Appl. No.: 16/588,041

(22) Filed: Sep. 30, 2019

(65) Prior Publication Data

US 2021/0094406 A1   Apr. 1, 2021

(51) Int. Cl.
  *B60K 7/00* (2006.01)
  *B60R 16/023* (2006.01)
  (Continued)

(52) U.S. Cl.
  CPC ............ *B60K 7/0007* (2013.01); *B60B 27/04* (2013.01); *B60K 17/356* (2013.01); *B60L 50/60* (2019.02);
  (Continued)

(58) Field of Classification Search
  CPC ..... B60K 7/0007; B60K 17/356; B60L 50/60; B62D 65/12
  See application file for complete search history.

(56) References Cited

U.S. PATENT DOCUMENTS 4,532,689 A   8/1985   Harder et al.
8,720,615 B2   5/2014   Wanger et al.
(Continued)

FOREIGN PATENT DOCUMENTS

CN   102897016 A   1/2013
CN   107160995 A   9/2017
(Continued)

*Primary Examiner* — Jonathan Ng
*Assistant Examiner* — James J Triggs
(74) *Attorney, Agent, or Firm* — Christopher G. Darrow; Darrow Mustafa PC

(57) ABSTRACT

A motive wheel and selectively attachable/detachable hub motor for an electric vehicle comprises an axle comprising an axle axis, outer end, and cylindrical axle hub; a wheel comprising an outer wheel surface, inner wheel surface, wheel hub configured for reversible rotatable disposition on the axle, and wheel rim configured to receive a tire; and a hub motor disposed proximate the outer wheel surface and configured for selective attachment to/detachment from the wheel and axle and comprising a cylindrical rotor and cylindrical stator, the cylindrical rotor configured for selective attachment to/detachment from the axle, the cylindrical stator extending away from the cylindrical rotor and configured for selective attachment to/detachment from the wheel hub, the hub motor configured for reversible rotation of the wheel and cylindrical stator, wherein upon attachment of the hub motor a motive wheel is provided, and wherein upon detachment of the hub motor a non-motive wheel is provided.

20 Claims, 8 Drawing Sheets

(51) Int. Cl.
  *B60L 50/60*    (2019.01)
  *B60K 17/356*    (2006.01)
  *B62D 65/12*    (2006.01)
  *F16D 55/226*    (2006.01)
  *B60B 27/04*    (2006.01)
  *B60B 21/00*    (2006.01)
  *B60B 27/00*    (2006.01)

(52) U.S. Cl.
  CPC .......... *B60R 16/0231* (2013.01); *B62D 65/12* (2013.01); *F16D 55/226* (2013.01); *B60B 21/00* (2013.01); *B60B 27/0015* (2013.01); *B60L 2220/44* (2013.01); *B60Y 2200/91* (2013.01)

(56) References Cited

U.S. PATENT DOCUMENTS

| | | | | |
|---|---|---|---|---|
| 8,746,396 B2* | 6/2014 | Vallejo | ................. | B60B 27/001 |
| | | | | 180/383 |
| 8,752,660 B2* | 6/2014 | Ajisaka | ................. | B60K 11/08 |
| | | | | 180/69.1 |
| 9,216,612 B2* | 12/2015 | Zdrahal | ................. | B60B 19/003 |
| 9,248,733 B2 | 2/2016 | Mair et al. | | |
| 9,428,265 B2* | 8/2016 | Cox | ..................... | B60K 7/0007 |
| 9,475,342 B2* | 10/2016 | Feng | ..................... | B60K 7/0007 |
| 9,616,706 B2* | 4/2017 | Benoit, Jr. | ............. | B60B 11/02 |
| 9,688,099 B2* | 6/2017 | Niemczyk | ............... | B60B 11/02 |
| 2007/0251742 A1 | 11/2007 | Adams, III et al. | | |
| 2007/0257570 A1 | 11/2007 | Walter et al. | | |
| 2008/0023237 A1 | 1/2008 | Houle | | |
| 2011/0124465 A1 | 5/2011 | Chen | | |
| 2019/0134474 A1 | 5/2019 | Schneiter | | |
| 2021/0061005 A1* | 3/2021 | Galang | .................... | B60K 1/02 |
| 2021/0061095 A1* | 3/2021 | Galang | ................ | B60K 17/354 |
| 2021/0094406 A1* | 4/2021 | Payne | ................... | B60K 17/354 |
| 2021/0094407 A1* | 4/2021 | Payne | ................... | B60K 7/0007 |

FOREIGN PATENT DOCUMENTS

| | | |
|---|---|---|
| DE | 2803739 A1 | 8/1978 |
| EP | 2340953 A1 | 6/2011 |
| GB | 190928475 A | 6/1910 |
| JP | 2017043213 A | 3/2017 |
| SU | 1661004 A1 | 7/1991 |

* cited by examiner

MOTIVE WHEEL COMPRISING A SELECTIVELY ATTACHABLE AND DETACHABLE HUB MOTOR AND METHOD OF MAKING AND USING THE SAME

FIELD OF THE INVENTION

The embodiments disclosed herein relate generally to a motive wheel comprising a selectively attachable and detachable hub motor and a method of making and using the same. More particularly, it relates to a plurality of motive wheels and selectively attachable and detachable hub motors and a method of making and using the same.

BACKGROUND

Hub motors or wheel motors, that is, electric motors that are incorporated into the hubs of wheels and drive them directly are increasingly being used in a wide variety of wheeled electric vehicles (EV's), particularly automotive electric vehicles. Typically, hub motors, particularly those used on various automotive electric vehicles are very closely integrated with the drive wheels on which they are installed such that they may not be removed without removing the entire wheel on which they are integrated. Frequently, the hub motor components, particularly the cylindrical rotor and cylindrical stator components, are not accessible for attachment or detachment from the outward facing side of the wheel. When one of the hub motor components fails, or when a change or upgrade of a motor component is desired, the entire hub motor and wheel must be removed to be serviced. The integrated hub motor and wheel assembly is heavy and expensive. Thus, the hub motors generally cannot be removed, replaced, repaired, or serviced directly by a vehicle user or operator, and they generally require service at a dedicated service facility, such as a dealer or dedicated vehicle repair shop, by trained service technicians. While vehicles that employ hub motors and wheels are useful with these constraints, enabling the hub motors and/or their components to be more easily separated and more easily accessible would reduce repair and replacement costs, enhance the usefulness and utility of hub motors, and thereby enhance vehicle owner and operator satisfaction.

Therefore, it would be very desirable to provide a hub motor and motive wheel configuration, as well as methods of making and using this configuration, that would address these limitations and provide the benefits mentioned.

SUMMARY OF THE INVENTION

In one embodiment, a motive wheel comprising a selectively attachable and detachable hub motor for an electric vehicle is disclosed. The motive wheel comprising a selectively attachable and detachable hub motor for an electric vehicle comprises: a non-rotatable axle comprising an axle axis, an outer end, and a cylindrical axle hub disposed inwardly from the outer end that extends radially outwardly away from the axle axis; a wheel comprising an outer wheel surface, an inner wheel surface, a wheel hub extending radially outwardly away from, and configured for reversible rotatable disposition on, the axle, and a wheel rim attached to and circumferentially extending about the wheel hub, the wheel rim comprising an outer rim portion that that extends axially away from the outer wheel surface and an inner rim portion that extend axially away from the inner wheel surface, an outer rim surface configured to receive a selectively inflatable and deflatable tire, the cylindrical spindle hub disposed proximate the inner wheel surface and the inner rim portion; and a selectively attachable and detachable hub motor disposed proximate the outer wheel surface and configured for selective attachment to and detachment from the wheel and axle, the selectively attachable and detachable hub motor comprising a concentric cylindrical rotor and a cylindrical stator, the cylindrical rotor extending radially outwardly from, and configured for selective attachment to and detachment from, the non-rotatable axle, the cylindrical stator radially spaced from, and extending radially outwardly away from, the cylindrical rotor and configured for selective attachment to and detachment from the wheel hub, the selectively attachable and detachable hub motor configured for reversible motive rotation of the wheel and cylindrical stator, wherein upon attachment of the selectively attachable and detachable hub motor a motive wheel is provided, and wherein upon detachment of the selectively attachable and detachable hub motor a non-motive wheel is provided.

In another embodiment, a method of making a motive wheel comprising a selectively attachable and detachable hub motor for an electric vehicle is disclosed. The method of making a motive wheel comprising a selectively attachable and detachable hub motor for an electric vehicle comprises: forming a non-rotatable axle comprising an axle axis, an outer end, and a cylindrical axle hub disposed inwardly from the outer end that extends radially outwardly away from the axle axis; disposing a wheel on the axle from the outer end, the wheel comprising an outer wheel surface, an inner wheel surface, a wheel hub extending radially outwardly away from, and configured for reversible rotatable disposition on, the axle, and a wheel rim attached to and circumferentially extending about the wheel hub, the wheel rim comprising an outer rim portion that that extends axially away from the outer wheel surface and an inner rim portion that extend axially away from the inner wheel surface, an outer rim surface configured to receive a selectively inflatable and deflatable tire, the cylindrical axle hub disposed proximate the inner wheel surface and the inner rim portion; and attaching a selectively attachable and detachable hub motor to the wheel and non-rotatable axle, the selectively attachable and detachable hub motor disposed proximate the outer wheel surface and configured for selective attachment to and detachment from the wheel and axle, the selectively attachable and detachable hub motor comprising a concentric cylindrical rotor and a cylindrical stator, the cylindrical rotor extending radially outwardly from, and configured for selective attachment to and detachment from, the non-rotatable axle, the cylindrical stator radially spaced from, and extending radially outwardly away from, the cylindrical rotor and configured for selective attachment to and detachment from the wheel hub, the selectively attachable and detachable hub motor configured for reversible motive rotation of the wheel and cylindrical stator, wherein upon attachment of the selectively attachable and detachable hub motor a motive wheel is provided, and wherein upon detachment of the selectively attachable and detachable hub motor a non-motive wheel is provided.

In yet another embodiment, a method of using a motive wheel comprising a selectively attachable and detachable hub motor for an electric vehicle is disclosed. The method of using a motive wheel comprising a selectively attachable and detachable hub motor for an electric vehicle comprises: forming a non-rotatable axle comprising an axle axis, an outer end, and a cylindrical axle hub disposed inwardly from the outer end that extends radially outwardly away from the axle axis; a wheel comprising an outer wheel surface, an inner wheel surface, a wheel hub extending radially outwardly away from, and configured for reversible rotatable disposition on, the axle, and a wheel rim attached to and circumferentially extending about the wheel hub, the wheel rim comprising an outer rim portion that that extends axially away from the outer wheel surface and an inner rim portion that extend axially away from the inner wheel surface, an outer rim surface configured to receive a selectively inflatable and deflatable tire, the cylindrical axle hub disposed proximate the inner wheel surface and the inner rim portion; and a selectively attachable and detachable hub motor disposed proximate the outer wheel surface and configured for selective attachment to and detachment from the wheel and axle, the selectively attachable and detachable hub motor comprising a concentric cylindrical rotor and a cylindrical stator, the cylindrical rotor extending radially outwardly from, and configured for selective attachment to and detachment from, the non-rotatable axle, the cylindrical stator radially spaced from, and extending radially outwardly away from, the cylindrical rotor and configured for selective attachment to and detachment from the wheel hub, the selectively attachable and detachable hub motor configured for reversible motive rotation of the wheel and cylindrical stator, wherein upon attachment of the selectively attachable and detachable hub motor a motive wheel is provided, and wherein upon detachment of the selectively attachable and detachable hub motor a non-motive wheel is provided; installing a plurality of first motive wheels and first non-motive wheels on a vehicle chassis to form a wheeled vehicle, wherein the first motive wheels are configured to provide motive propulsion of the wheeled vehicle.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
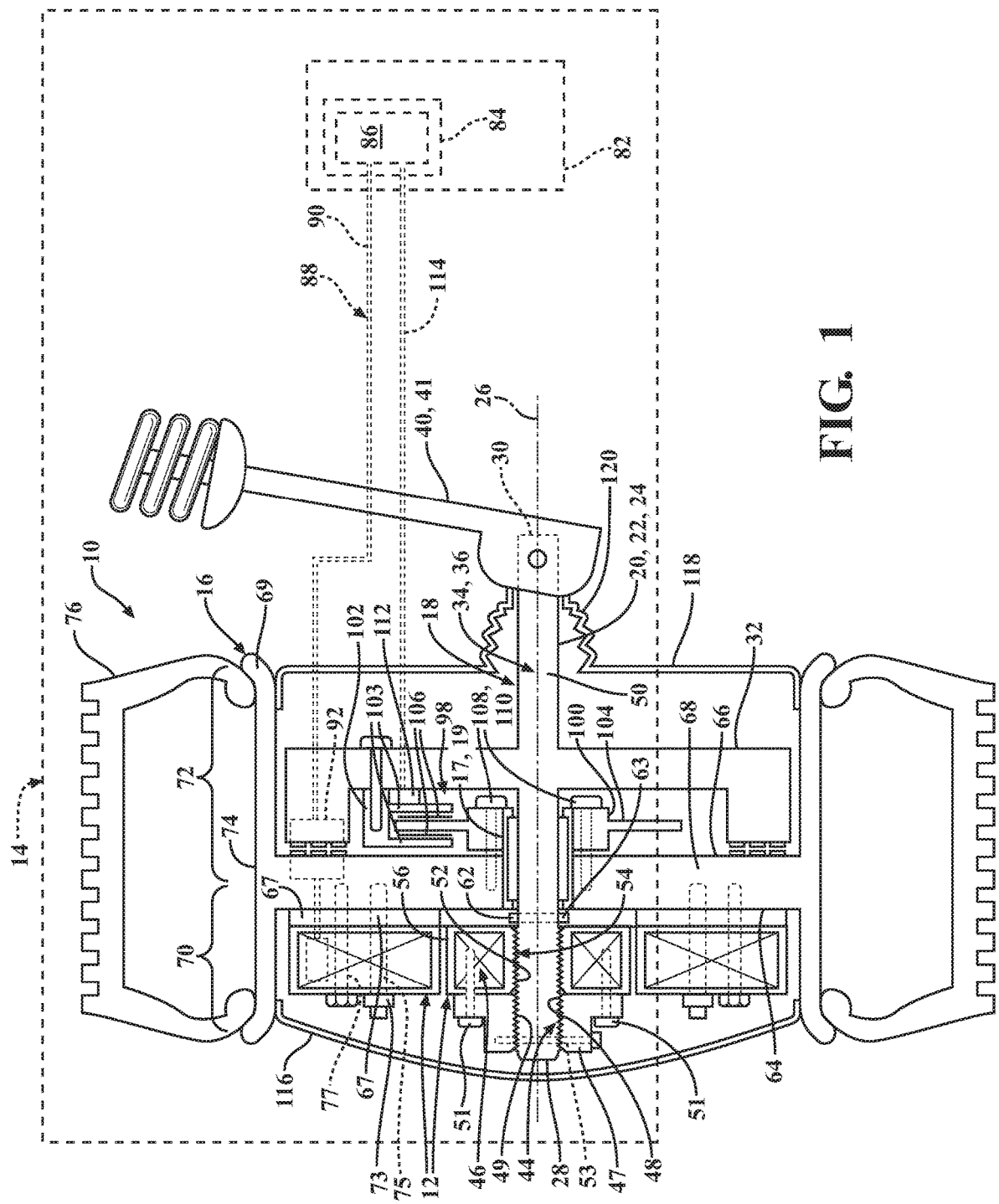
FIG. 1 is a schematic cross-sectional view of an embodiment of a motive wheel comprising a selectively attachable and detachable hub motor for an electric vehicle, as described herein.
Figure 2:
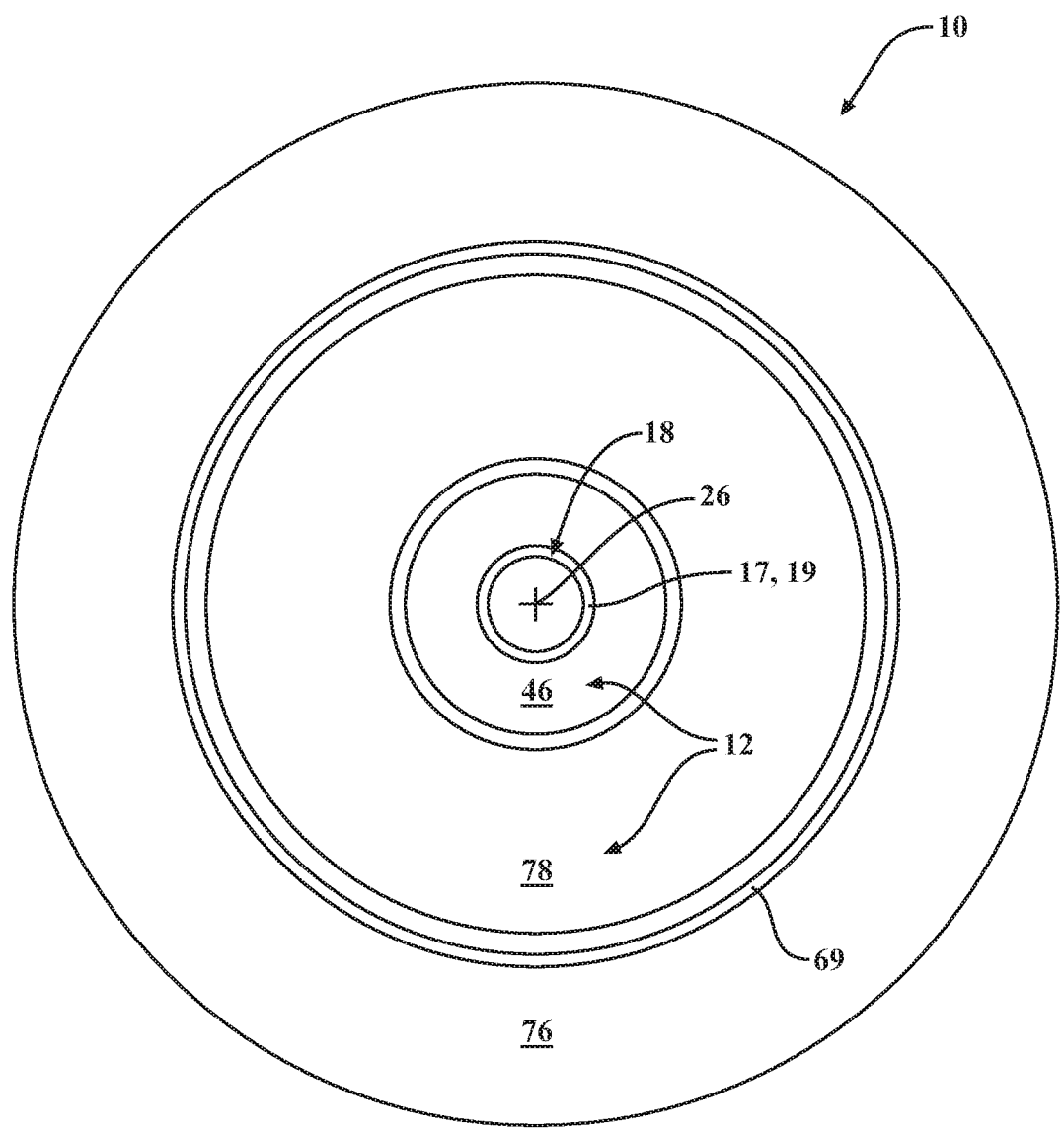
FIG. 2 is a schematic side view of an embodiment of a motive wheel comprising a selectively attachable and detachable hub motor for an electric vehicle as described herein with the outer wheel cover and spindle cap removed.

The present invention comprises a motive wheel comprising a selectively attachable and detachable hub motor for an electric vehicle. The motive wheel comprising a selectively attachable and detachable hub motor is very advantageous because the wheel is configured so that the selectively attachable and detachable hub motor may be attached and detached from the outward facing side of the wheel. The invention is also very advantageous because the selectively attachable and detachable hub motor can be attached or detached and removed from the wheel while the wheel remains on the vehicle. This provides more versatility and convenience in the service, repair, replacement, and upgrade of the selectively attachable and detachable hub motors. Selectively attachable and detachable hub motors can be removed in the course of operation and use, such as alongside a roadway, or in a driveway or street, without the need to visit a vehicle service facility. The selectively attachable and detachable hub motors can also advantageously be swapped between motive wheels and non-motive wheels to address a flat tire on one of the motive wheels, so that the weight of the motor is removed from the wheel and so that the motive power of the wheel with the flat is maintained on a different wheel. The selectively attachable and detachable hub motors can also be swapped between motive wheels and non-motive wheels in a situation where the vehicle is stuck and movement to the non-motive wheel would provide additional tractive effort to assist in getting the vehicle unstuck. The invention also provide flexible vehicle configuration or reconfiguration because the selectively attachable and detachable hub motors can also advantageously be swapped from motive wheels to non-motive wheels to alter the drive type of the vehicle, such as from FWD that may be useful for certain uses or road conditions (e.g. city driving, short trips, slippery road conditions) to RWD that may be useful for different uses or road conditions (e.g. towing), or vice versa. Additional selectively attachable and detachable hub motors can also advantageously be added to a FWD or RWD configured vehicle to provide additional motive wheels creating an AWD or 4WD vehicle that may be useful for further different uses or road conditions (e.g. higher performance, off-road use, snow or ice road conditions, towing). These changes in vehicle drive configuration can be temporary or permanent. Thus, a vehicle that is normally configured for two wheel drive (2WD), such as for commuter or city driving, can be changed temporarily to an AWD or 4WD configuration for an event, such as a vacation or road trip or for off-road use, and then changed back to the 2WD configuration when the event is over.

The selectively attachable and detachable hub motor comprises a cylindrical rotor and cylindrical stator. The cylindrical rotor is disposed in a ring-shaped cylindrical rotor housing and attached to the non-rotatable axle. The cylindrical stator is disposed in a separate ring-shaped cylindrical stator housing that comprises a circular rotor opening and is attached to the outer surface of the wheel hub. The cylindrical rotor is disposed in the rotor opening. The wheel hub is rotatably disposed through a rotatable bearing on the non-rotating axle. The cylindrical stator is electrically connected to the vehicle battery through a rotatable electrical connection, such as a plurality of rotatable slip ring connectors, for controlled communication of electrical power to the selectively attachable and detachable hub motor from the vehicle battery. The controlled electromotive force between the cylindrical stator and cylindrical rotor generated by the operation of the selectively attachable and detachable hub motor drives the rotation of the wheel and cylindrical stator for propulsion of vehicle.

As used herein, the terms front or forward or rear or rearward or aft refer to the front or rear of the article or vehicle, or to a direction toward the front or rear of the article or vehicle, respectively. The terms longitudinal or along the length refers to a direction that extends along or generally parallel to an article or vehicle centerline between the front and the rear, or from one end to an opposed end. The terms transverse, lateral, or along the width, or left-right refers to a direction that is orthogonal, or substantially orthogonal, to the longitudinal direction. The terms up or upward or down or downward refer to the top or bottom of the article or vehicle, or to a direction substantially toward the top or bottom of the article or vehicle, respectively. The terms in or inner or inward refer to a direction toward the center of the article or vehicle, and out or outer or outward refers to the opposite direction away from the center or central portion of the article or vehicle. The term selectively attachable and detachable used in reference to a component indicates that a human user or operator may choose to attach or detach the component from the structure with which it is associated or related.

Referring to FIGS. 1-10, a motive wheel 10 comprising a selectively attachable and detachable hub motor 12 for an electric vehicle 14 is disclosed. As used herein, a motive wheel 10 refers to a drive or propulsion wheel for an electric vehicle 14 that is powered by the selectively attachable and detachable hub motor 12, which is an electric motor that is configured to be disposed on and within a wheel 16 of the electric vehicle 14. The electric vehicle 14 may include any type of motorized wheeled vehicle in which vehicle movement is provided and supported on spaced apart rotatable motive wheels 10 that are rotatably disposed on a non-rotatable axle 18 or a plurality of non-rotatable axles. The non-rotatable axle 18 may comprise a front axle 20, rear axle 22, or front and rear axle of the electric vehicle 14, and motive wheels 10 may comprise steerable wheels or non-steerable wheels.

The electric vehicle 14 may include all manner of automotive vehicles, including all manner of cars, sport and other types of utility vehicles (SUV), and trucks, including light-duty, medium-duty, and heavy-duty trucks. The electric vehicle 14 may also include all manner of recreational vehicles (RV's), all terrain vehicles (ATV's) and side-by-side vehicles, including utility or utility task vehicles (UTV's) and multipurpose off-highway utility vehicles (MOHUV's). The electric vehicle 14 may comprise an electric vehicle (EV), where all of the motive power of the vehicle wheels is provided by electric selectively attachable and detachable hub motors 12 as described herein, or a hybrid electric vehicle where the motive power of some of the vehicle wheels is provided by an internal combustion engine and some of the motive power is provided by electric selectively attachable and detachable hub motors 12 as described herein.

Figure 5:
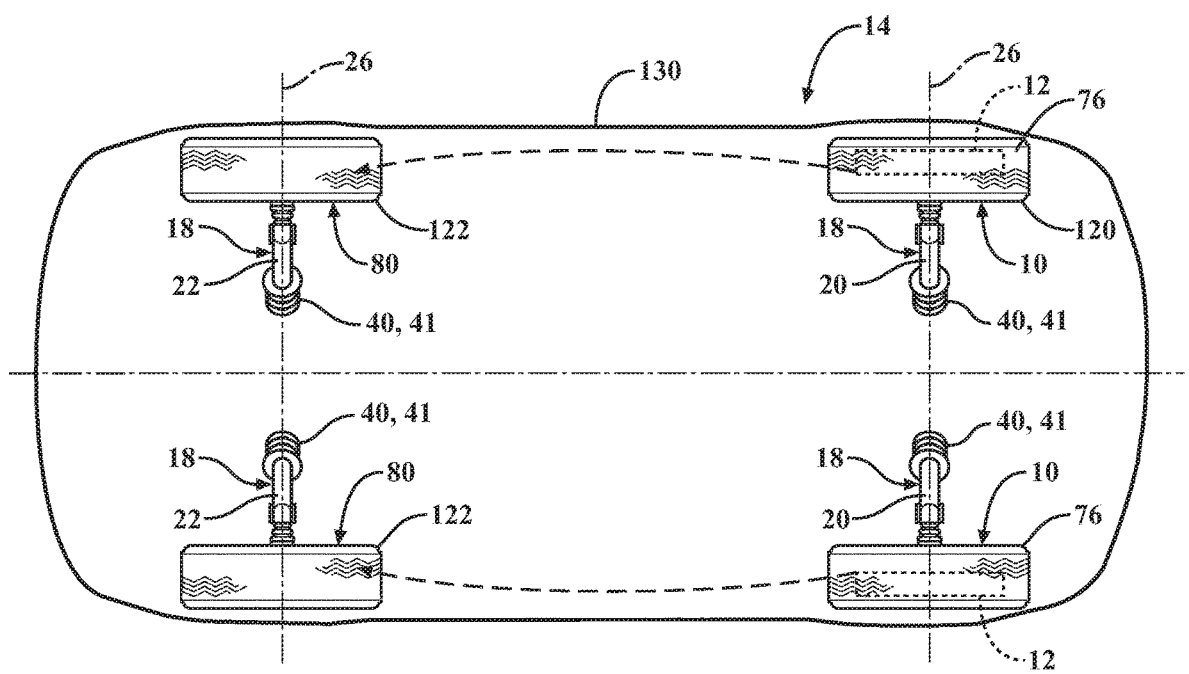
FIG. 5 is a schematic bottom view of an embodiment of an electric vehicle configured for front wheel drive (FWD) comprising a pair of motive wheels and selectively attachable and detachable hub motors that comprise a front axle and pair of non-motive wheels comprising a rear axle, as described herein, as well as a method of using the electric vehicle of FIG. 5 by moving the motive wheels from the front to the rear to convert the FWD vehicle to a rear wheel drive (RWD) vehicle, as described herein.
Figure 6:
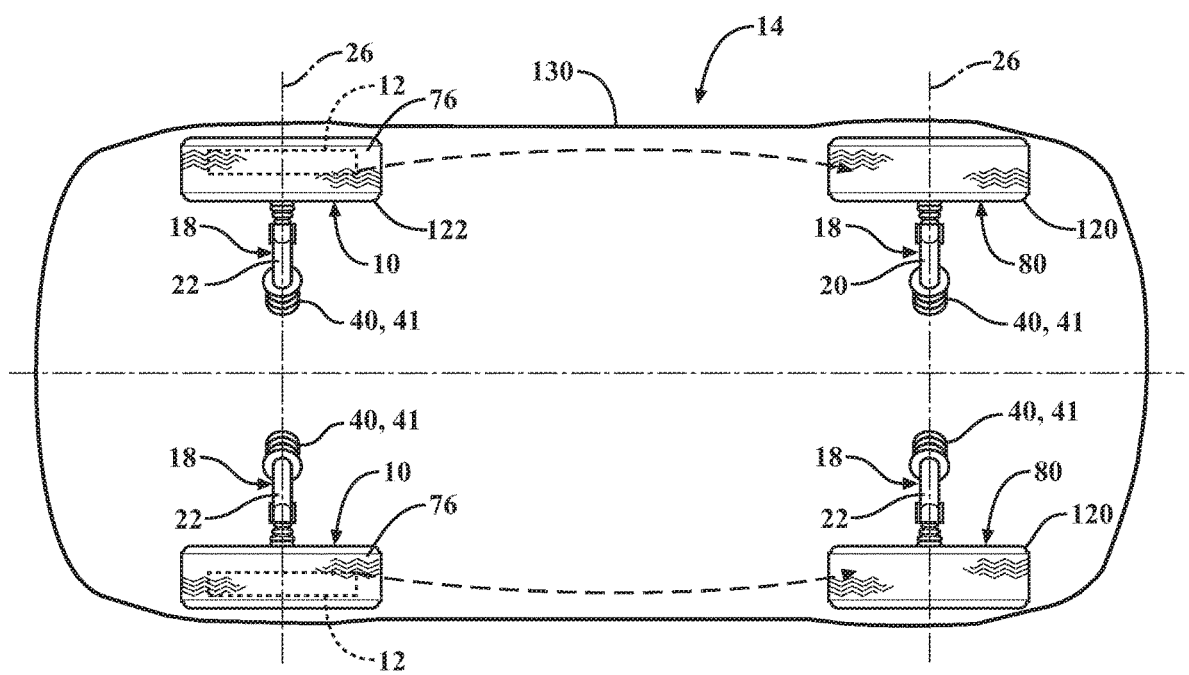
FIG. 6 is a schematic bottom view of an embodiment of an electric vehicle configured for RWD comprising a pair of motive wheels and selectively attachable and detachable hub motors that comprise a rear axle and pair of non-motive wheels comprising a front axle, as described herein, as well as a method of using the electric vehicle of FIG. 6 by moving the motive wheels from the rear to the front to convert the RWD vehicle to an FWD vehicle, as described herein.
Figure 7:
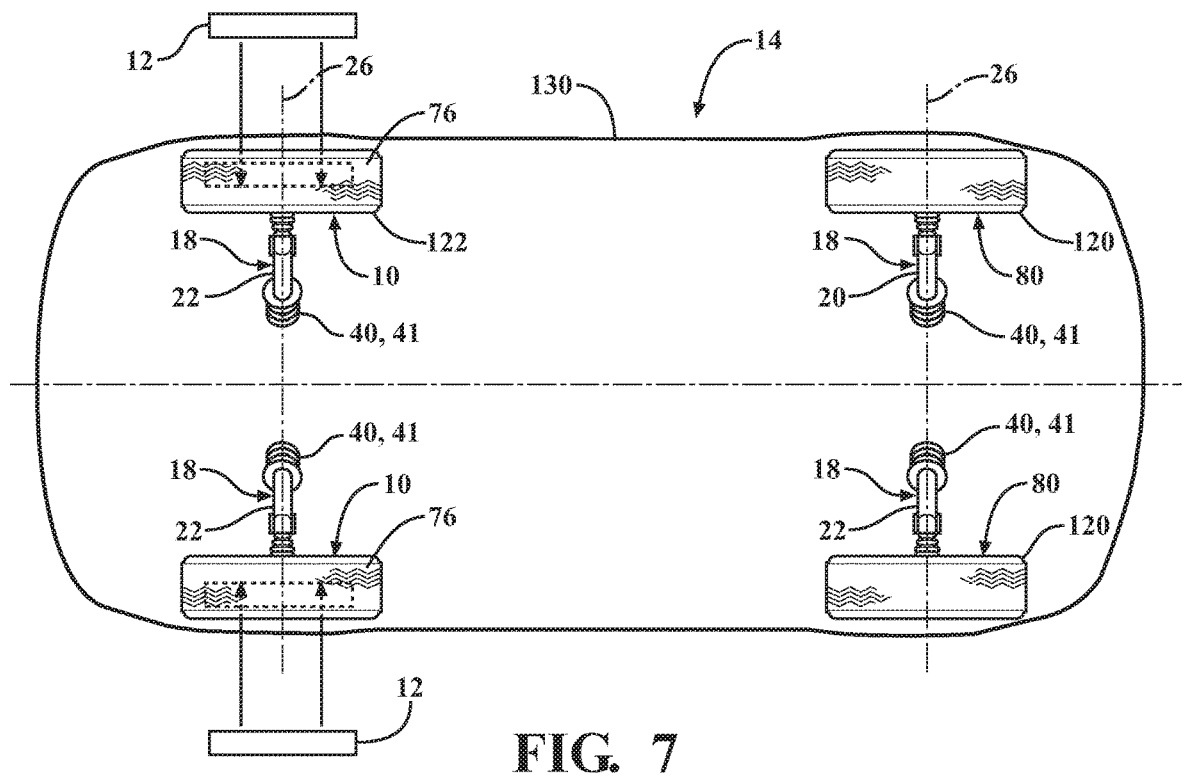
FIG. 7 is a schematic bottom view of an embodiment of an embodiment of an electric vehicle configured for all-wheel drive or 4 wheel drive (AWD or 4WD) comprising a pair of motive wheels and selectively attachable and detachable hub motors that comprise a front axle and pair of motive wheels and selectively attachable and detachable hub motors that comprise a rear axle, as described herein, as well as a method of using the electric vehicle of FIG. 5 by adding motive wheels to the rear to convert the FWD vehicle to an AWD or 4WD vehicle, as described herein.

The motive wheel 10 comprising a selectively attachable and detachable hub motor 12 may be used on the electric vehicle 14 in any desired manner or location, including as a front axle to provide a front wheel drive (FWD) vehicle, a rear axle to provide a rear wheel drive (RWD) vehicle, or as a front and rear axle to provide an all-wheel drive (AWD) or four wheel drive (4WD) vehicle as illustrated, for example, in FIGS. 5-7. The motive wheel 10 comprising a selectively attachable and detachable hub motor 12 may also be used to provide a supplementary drive axle, such as a supplementary rear drive axle 24 (FIG. 9) as might be used on a larger electric vehicle 14 such as an RV 25 or various trucks, to enhance the load carrying or towing capacity of the electric vehicle 14.

Figure 3:
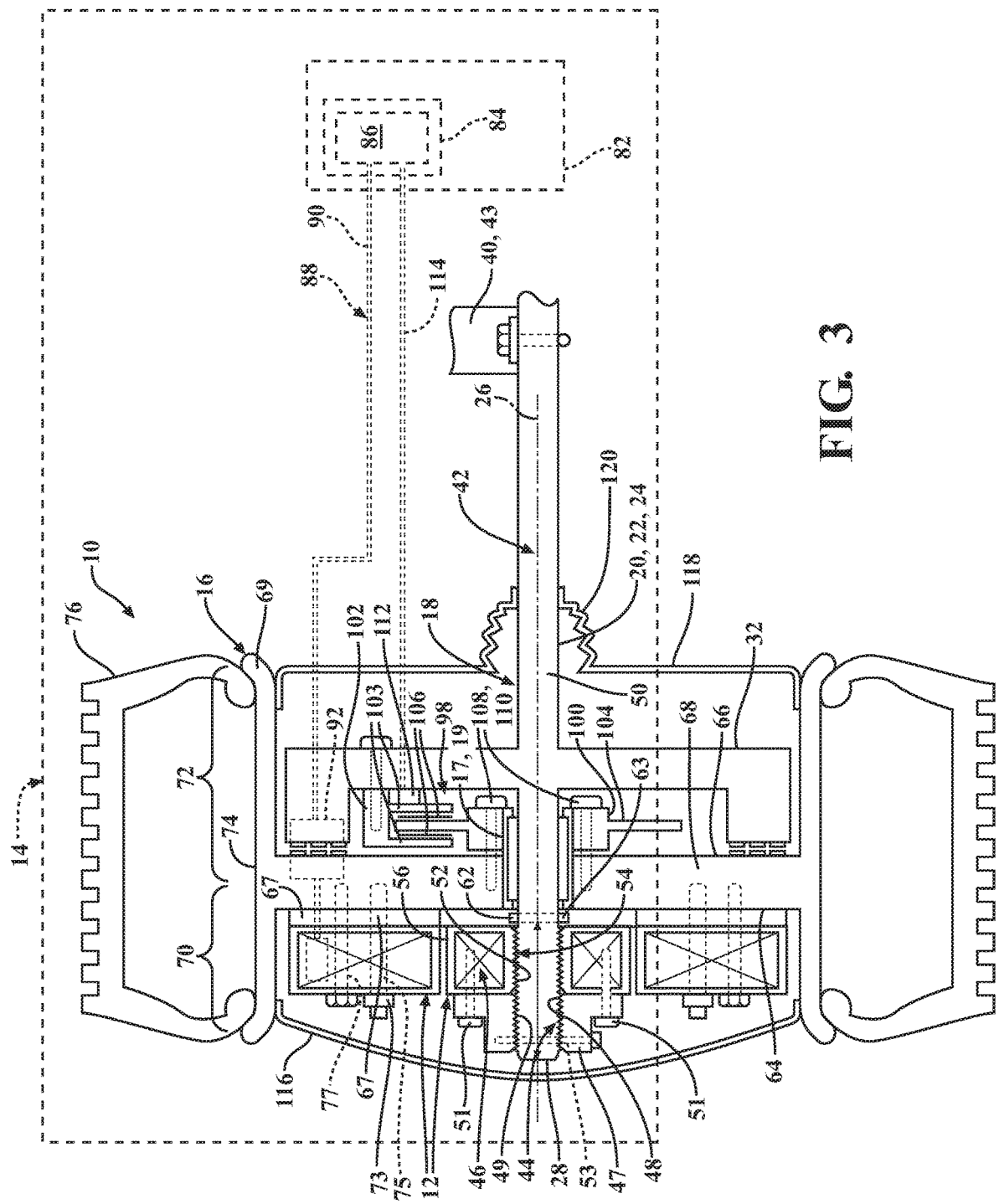
FIG. 3 is a schematic cross-sectional view of a second embodiment of a motive wheel comprising a selectively attachable and detachable hub motor for an electric vehicle, as described herein.
Figure 4:
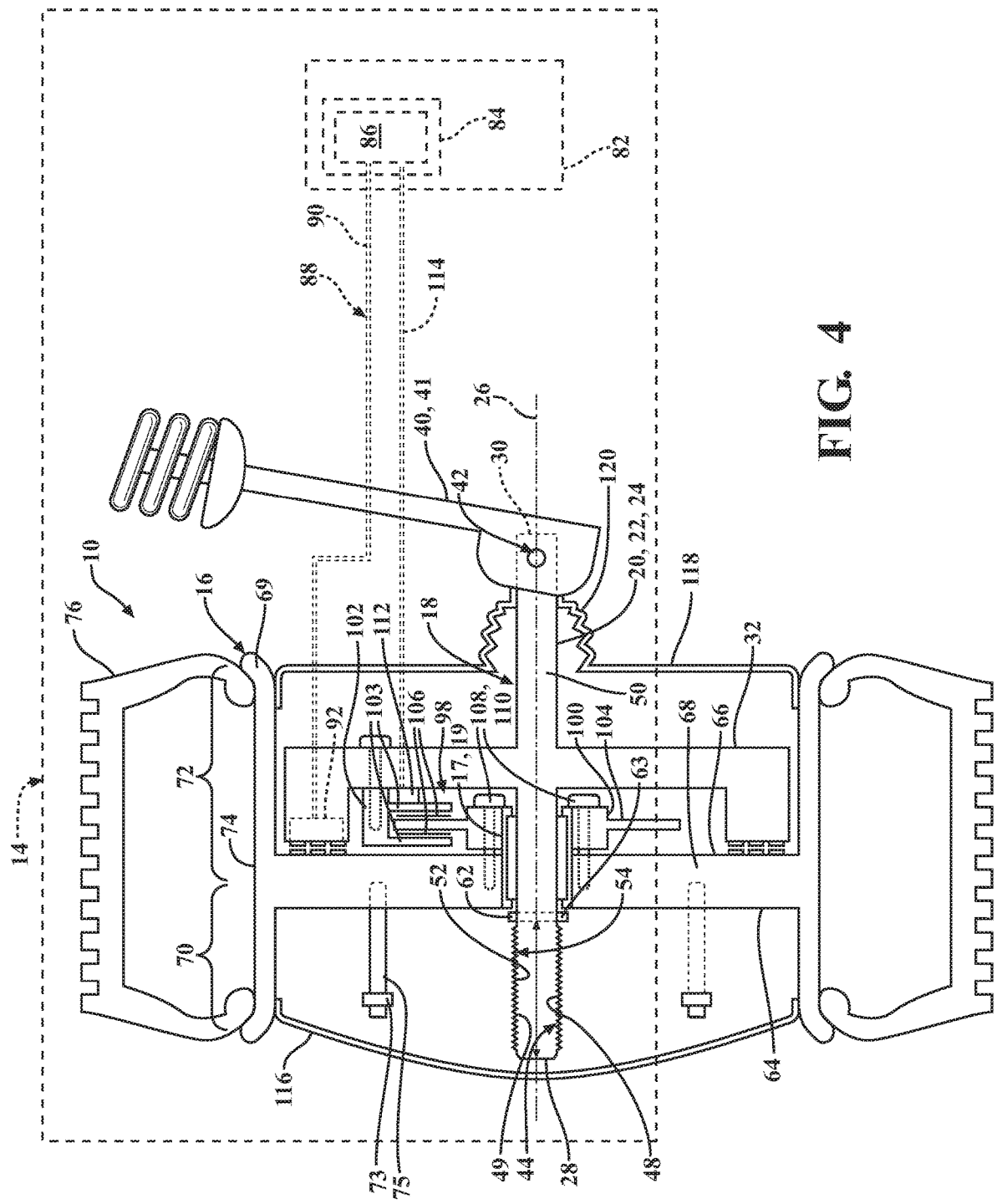
FIG. 4 is a schematic cross-sectional view of an embodiment of a non-motive wheel as described herein.

The motive wheel 10 comprising a selectively attachable and detachable hub motor 12 comprises a non-rotatable axle 18 comprising an axle axis 26, an outer end 28, an opposed inner end 30 in the case of a discontinuous axle 34, and a cylindrical axle hub 32 disposed inwardly from the outer end (e.g. between the outer end and the inner end) that extends radially outwardly away from the axle axis. The cylindrical axle hub 32 may have any suitable cylindrical shape, including various cylindrical disks, such as a hollowed cylindrical disk with an outwardly opening U-shape cross section as shown in FIGS. 1, 3 and 4, for example. The non-rotatable axle 18 may comprise a discontinuous or independent axle 34, such as a wheel spindle 36, that does not extend laterally across the entire width of the electric vehicle 14 but is configured to support a single wheel 16 and for attachment to the vehicle suspension 40, such as an independent vehicle suspension 41 configuration where the mass of the vehicle is apportioned and flexibly and springingly supported (i.e. sprung) independently by each wheel as shown schematically in FIG. 1, or a dependent vehicle suspension configuration where the mass of the vehicle is apportioned and flexibly and springingly supported (i.e. sprung) dependently by a pair of opposed wheels (e.g. front or rear wheels). Alternately, the non-rotatable axle 18 may comprise a continuous axle 42 that does extend laterally across the entire width of the electric vehicle 14, either as a single piece or as a plurality of mechanically linked pieces, and is joined to and configured to support a pair of wheels 16 to the axle at opposed outer ends 28 thereof as illustrated schematically in FIG. 3. The continuous axle 42 and wheels 16 are also attached to the suspension 40 together in a dependent suspension 43 configuration where the mass of the vehicle is flexibly and springingly supported (i.e. sprung) on the suspension 40 dependently by a pair of wheels joined by the non-rotatable axle as also shown in FIG. 3. The non-rotatable axle 18 may be formed from any suitable material, including various metals, such as various alloys of steel, aluminum, magnesium, and titanium, and composites, such as various polymer/fiber composites.

The non-rotatable axle 18 may have any suitable axle configuration, size, or shape, and in one embodiment may comprise a cylindrical axle, including a hollow axle or a solid axle. The non-rotatable axle 18 comprises a rotor attachment 44 for attachment of the cylindrical rotor 46 proximate the outer end 28. The rotor attachment 44 may have any suitable configuration. In one embodiment, the rotor attachment 44 comprises a plurality of axle screw threads or axle splines 48 formed into the outer surface 50 of the non-rotatable axle 18 that are configured to engage a plurality of mating rotor housing screw threads or rotor housing splines 52 formed into an axle attachment 54 of the cylindrical rotor housing 56. In one embodiment, the axle attachment 54 of the cylindrical rotor housing 56 comprises a cylindrical surface and defines a cylindrical opening and the rotor housing screw threads or rotor housing splines 52 are disposed thereon. In one embodiment, the cylindrical rotor 46 and cylindrical rotor housing 56 are cylindrical, and the cylindrical rotor 46 is configured for disposition within the cylindrical rotor housing 56. The cylindrical rotor 46 and cylindrical rotor housing 56 are attached to and positioned on the non-rotatable axle 18 by threading or sliding on, respectively, the cylindrical rotor housing 56 and rotor housing screw threads or rotor housing splines 52 onto the non-rotatable axle 18 and axle screw threads or axle splines 48 to a predetermined rotor position ($P_R$) as measured along the length of the non-rotating axle from the outer end 28 and/or away from the outer wheel surface 64. The cylindrical rotor 46 may be detached and removed from the non-rotatable axle 18 by unthreading or sliding off, respectively, the cylindrical rotor housing 56 and rotor housing screw threads or rotor housing splines 52 of the cylindrical rotor from the non-rotatable axle 18 and axle screw threads or axle splines 48. The cylindrical rotor 46 may be secured onto the non-rotatable axle 18 by a cylindrical rotor cap 47 having a cylindrical ring shape that comprises a cap screw threads or cap splines 49 on an inner diameter that are configured to matingly engage the axle screw threads or axle splines 48. In one embodiment, the cylindrical rotor cap 47 may be further attached to the cylindrical rotor housing 56 and/or cylindrical rotor 46 using a plurality of axially extending threaded cap fasteners 51 and/or to the non-rotatable axle 18 by a radially extending threaded axle fastener 53. In one embodiment, the The predetermined position ($P_R$) may be selected to provide a predetermined axial alignment with the cylindrical stator 78, which in one embodiment may be selected to provide a predetermined radial magnetic flux when the selectively attachable and detachable hub motor 12 is powered, as described herein. In one embodiment, the predetermined position ($P_R$) may be established by a rotor stop 60 disposed on the non-rotatable axle 18. Any suitable rotor stop 62 may be provided, such as a threaded bolt or threaded pin 63, or a snap ring, or the like, to establish and fix $P_R$ as the cylindrical rotor housing 56 is threaded or slid, respectively, onto the non-rotating axle 18. In one embodiment, the cylindrical stator 78 is also fixed in a predetermined position ($P_S$) from the outer wheel surface 64 by a stator spacer 67 disposed between the cylindrical stator 78 and the wheel hub 68. The predetermined position ($P_S$) from the outer wheel surface 64 may be defined by a thickness of the stator spacer 67. The predetermined axial alignment of cylindrical rotor 46 and cylindrical stator 78 is an axial alignment (and radial spacing) that is configured to provide the magnetic flux needed for motive operation of the motor. In one embodiment, the stator spacer 67 comprises a cylindrical ring having an inner diameter and outer diameter selected to conform to an inner diameter and outer diameter of the cylindrical stator 78. The cylindrical stator 78 may be attached to the stator spacer 67 and wheel hub 68 by any suitable attachment, which in one embodiment comprises a plurality of threaded stator fasteners 77 that may be threaded into a plurality of corresponding hub bores formed within the wheel hub 68. The cylindrical stator 78 may also be positioned on wheel hub by using a plurality of threaded guide studs or pins 75, which may also be used to attach the cylindrical stator 78 using a plurality of correspondingly threaded nuts 73. The stator spacer may have any suitable size and thickness and may be formed from any suitable material. In one embodiment, suitable spacer materials include various metals, such as alloys of steel, aluminum, magnesium, and titanium. Metals are advantageous materials for use as stator spacers 67, as well being advantageous for use as the cylindrical stator housing 79 and wheel 16 because they have high thermal conductivity and are configured to as heat sinks to remove heat generated by the selectively attachable and detachable hub motor, particularly the cylindrical stator 78, during operation.

The motive wheel 10 comprising a selectively attachable and detachable hub motor 12 comprises a wheel 16 comprising an outer wheel surface 64, an inner wheel surface 66, a wheel hub 68 extending radially outwardly away from, and configured for reversible rotatable disposition on, the non-rotatable axle 18, and a wheel rim 69 attached to and circumferentially extending about the wheel hub. The wheel rim 69 comprises an outer rim portion 70 that extends axially away from the outer wheel surface 64 and an inner rim portion 72 that extends axially away from the inner wheel surface 66. The wheel rim 69 also comprises an outer rim surface 74 configured to receive a selectively inflatable and deflatable tire 76. The cylindrical axle hub 32 is disposed proximate the inner wheel surface 66 and the inner rim portion 72. The wheel may have any suitable size, including any suitable wheel diameter or width of the wheel hub 68 or wheel rim 69. The size of the wheel 16 may be selected and the wheel configured to sealably engage a selectively inflatable and deflatable tire 76 of any size. The wheel 16 may be made from any suitable high strength material, including various metals, such as, for example, alloys of steel, aluminum, titanium, and magnesium. The wheel 16 is configured to be rotatably disposed on the non-rotatable axle 18. The rotatable disposition may be accomplished by any suitable rotatable device 17, including various configurations of rotatable bushings or bearings. In one embodiment, the rotatable device 17 comprises a wheel bearing 19. The wheel bearing 19 may comprise any suitable type of bearing or bearing configuration sufficient to rotatably support the sprung mass of the electric vehicle 14 and unsprung mass of the motive wheel 10.

The motive wheel 10 comprising a selectively attachable and detachable hub motor 12 also comprises a selectively attachable and detachable hub motor 12, which may also be referred to as an electric hub motor 12, disposed proximate the outer wheel surface 64 and is configured for selective attachment to and detachment from the wheel 16 and non-rotatable axle 18. The selectively attachable and detachable hub motor 12 comprises the cylindrical rotor 46 that is concentrically disposed within a cylindrical stator 78. The cylindrical rotor 46 extends radially outwardly from, and is configured for selective attachment to and detachment from, the non-rotatable axle 18 as described herein. The cylindrical stator 78 is radially spaced from, and extends radially outwardly away from, the cylindrical rotor 46 and is configured for selective attachment to and detachment from the wheel hub 68 of the wheel 16. In one embodiment, the cylindrical rotor 46 is disposed in a cylindrical rotor housing 56 and the cylindrical stator 78 is disposed in a cylindrical stator housing 79 and the cylindrical stator housing 79 is radially spaced from the cylindrical rotor housing 56. In one embodiment, the cylindrical rotor 46 is disposed in a cylindrical rotor housing 56 and the cylindrical stator 78 is disposed in a cylindrical stator housing 79, and the cylindrical stator housing 79 is radially spaced from the cylindrical rotor housing 56, wherein the cylindrical stator housing 79 comprises a cylindrical ring defining a circular rotor opening 81 disposed concentrically about the axle axis 26 and the cylindrical rotor housing 56 comprises a cylindrical ring disposed concentrically about the axle axis 26 within the circular rotor opening 81. The cylindrical rotor housing 56 and cylindrical stator housing 79 may be made from the same material or different housing materials. Suitable housing materials include various metals, such as alloys of steel, aluminum, magnesium, and titanium, various filled and unfilled engineering plastics, such as carbon and glass fiber-reinforced plastics, and combinations and composites thereof. Because the wheel 16 is rotatably disposed on the non-rotatable axle 18, the cylindrical stator 78 and cylindrical stator housing 79 that is attached to the wheel is also rotatably disposed on the non-rotatable axle 18. The selectively attachable and detachable hub motor 12 is configured for reversible motive rotation of the wheel 16 and cylindrical stator 78, wherein upon attachment of the selectively attachable and detachable hub motor 12 to the wheel 16 a motive wheel 10 is provided, and wherein upon detachment of the selectively attachable and detachable hub motor 12 from the wheel 16 an unpowered or non-motive wheel 80 is provided as illustrated in FIG. 4. Advantageously, in one embodiment, the non-motive wheel 80 may be configured to comprise the same construction and same common components as the motive wheel 10. This construction advantageously enables swapping the selectively attachable and detachable hub motor or motors 12 of a motive wheel or wheels 10 of a given electric vehicle 14 onto a non-motive wheel or wheels 80 without removing the wheel or wheels 16 to change the location of the motive wheel or wheels 10 on the electric vehicle 14 including, for example, moving the selectively attachable and detachable hub motors from front to rear to change the vehicle's drive type from FWD to RWD, or vice versa, or moving only one selectively attachable and detachable hub motor 12 from a front motive wheel 10 to a rear non-motive wheel 80. This construction also advantageously enables the addition of a selectively attachable and detachable hub motor or motors 12 to a non-motive wheel or wheels 80 of an electric vehicle 14 to improve the performance of the vehicle, including, for example, changing the vehicle's drive type from FWD or RWD to AWD or 4WD. For example, in one embodiment the electric vehicle 14 may comprise a plurality of motive wheels 10 and non-motive wheels 80, and more particularly, in a common configuration, the plurality of motive wheels 10 may comprise two motive wheels and the plurality of non-motive wheels 80 may comprise two non-motive wheels. In this embodiment, where the two motive wheels 10 are front wheels 120 comprising a front axle 20 and the two non-motive wheels 80 are rear wheels 122 comprising a rear axle 22 and the electric vehicle 14 is configured as an FWD vehicle, and the selectively attachable and detachable hub motors 12 are configured for detachment from the front wheels as described herein to make the front wheels 120 non-motive wheels 80 and attachment to the rear wheels 122 and electrically connected as described herein to make the rear wheels motive wheels 10, thereby reconfiguring the FWD vehicle to an RWD vehicle as illustrated schematically in FIG. 5.

In another embodiment, where the plurality of motive wheels 10 may comprise two motive wheels and the plurality of non-motive wheels 80 may comprise two non-motive wheels, the two motive wheels 10 are rear wheels 122 comprising a rear axle 22 and the two non-motive wheels 80 are front wheels 120 comprising a front axle 20 and the electric vehicle 14 is configured as an RWD vehicle, and the selectively attachable and detachable hub motors 12 are configured for detachment from the rear wheels to make the rear wheels non-motive wheels and attachment to the front wheels to make the front wheels motive wheels, thereby reconfiguring the RWD vehicle to an FWD vehicle as illustrated schematically in FIG. 6.

Figure 8:
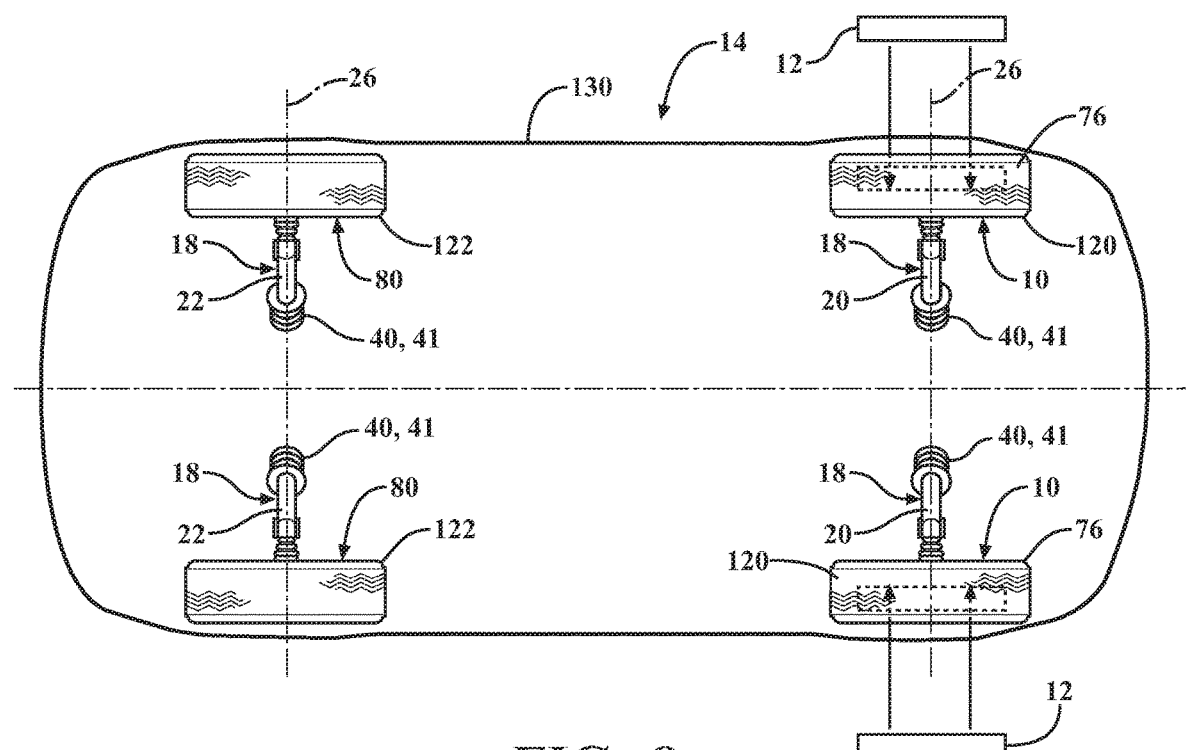
FIG. 8 is a schematic bottom view of an embodiment of an embodiment of an electric vehicle configured for AWD or 4WD comprising a pair of motive wheels and selectively attachable and detachable hub motors that comprise a front axle and pair of motive wheels and selectively attachable and detachable hub motors that comprise a rear axle, as described herein, as well as a method of using the electric vehicle of FIG. 6 by adding motive wheels to the front to convert the RWD vehicle to an AWD or 4WD vehicle, as described herein.
Figure 9:
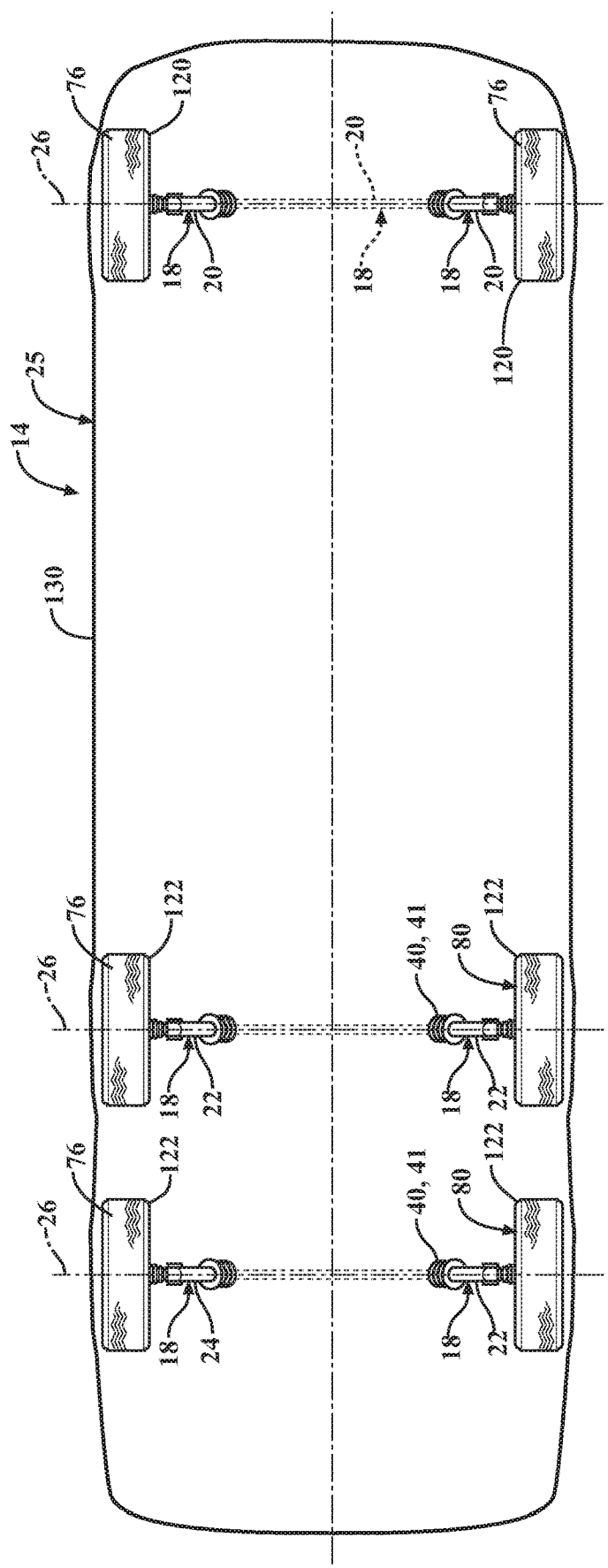
FIG. 9 is a schematic bottom view of an embodiment of an electric vehicle configured for RWD comprising a two pair of motive wheels and corresponding selectively attachable and detachable hub motors that comprise a rear axle and a supplemental axle and pair of non-motive wheels comprising a front axle, as described herein.
Figure 10:
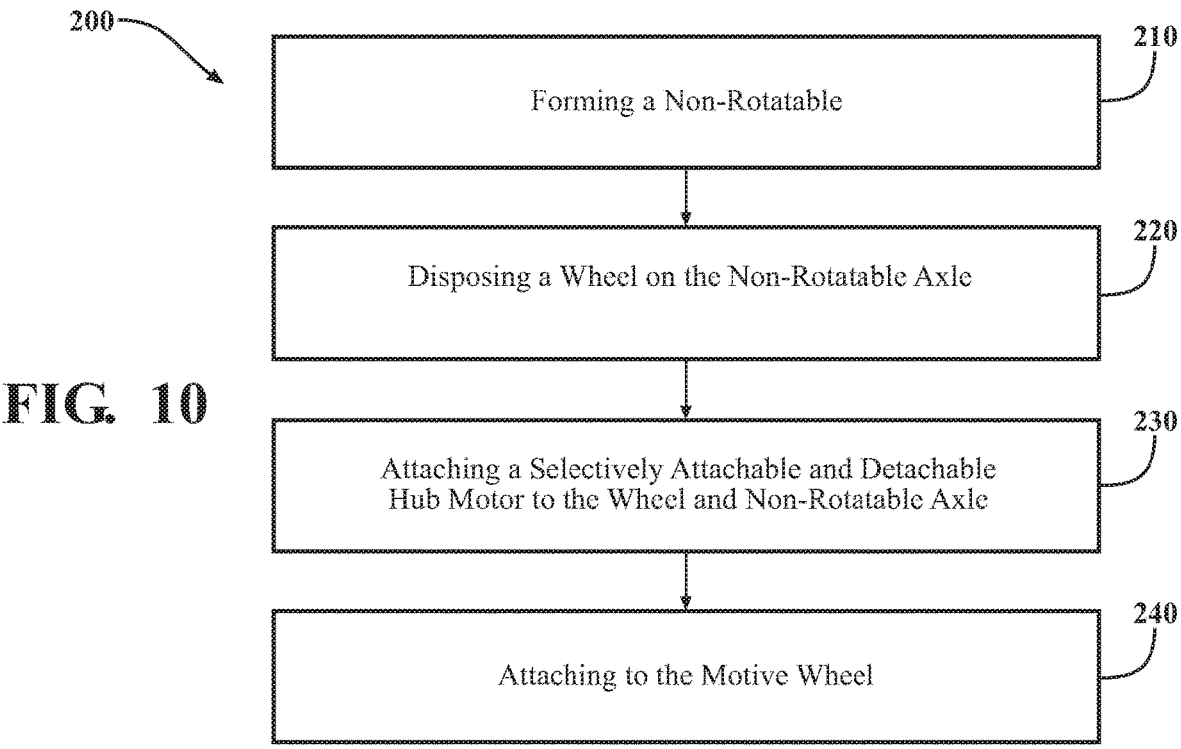
FIG. 10 is a flowchart of an embodiment of a method of making a motive wheel and selectively attachable and detachable hub motor, as described herein.
Figure 11:
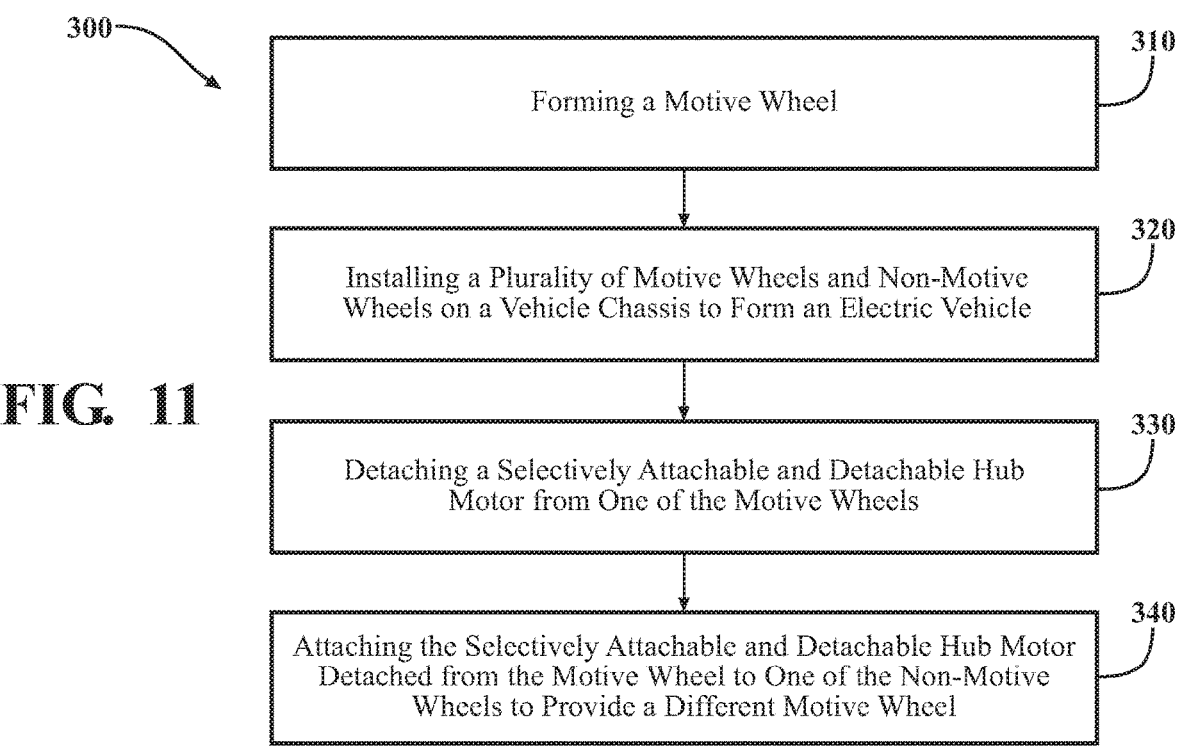
FIG. 11 is a flowchart of an embodiment of a method of using a motive wheel and selectively attachable and detachable hub motor and an electric vehicle, as described herein.

In yet another embodiment, where the plurality of motive wheels 10 may comprise two motive wheels and the plurality of non-motive wheels 80 may comprise two non-motive wheels, the two motive wheels 10 are front wheels 120 comprising a front axle 20 and the two non-motive wheels 80 are rear wheels 122 comprising a rear axle 22 and the electric vehicle 14 is configured as an FWD vehicle (FIG. 7), or the two motive wheels 10 are rear wheels 122 comprising a rear axle 22 and the two non-motive wheels 80 are front wheels 120 comprising a front axle 20, or and the electric vehicle 14 is configured as an RWD vehicle (FIG. 8), the vehicle further comprises two additional selectively attachable and detachable hub motors 12 that are configured for attachment to the respective non-motive wheels to convert the FWD vehicle or RWD vehicle, respectively, into an AWD or 4WD vehicle as illustrated in FIGS. 7 and 8. The additional selectively attachable and detachable hub motors 12 may added by any method, including by being purchased, borrowed, rented, or leased, for example.

The selectively attachable and detachable hub motor 12 may comprise any suitable type of outer rotation radial flux electric motor comprising a fixed or non-rotatable cylindrical rotor 46 and a selectively and reversibly rotatable cylindrical stator 78 disposed radially outwardly of the cylindrical rotor as described herein. The selectively attachable and detachable hub motor 12 may comprise any suitable type of electric motor having the configuration of cylindrical rotor 46 and cylindrical stator 78 described herein, including various alternating current (AC) and direct current (DC) powered electric motors, including both brushed (BDC) and brushless (BLDC) motors. The selectively attachable and detachable hub motor 12 may comprise conventional electric motor designs. In one embodiment, the selectively attachable and detachable hub motor 12 may comprise an AC electric motor and conventional power electronics including a current inverter and a voltage converter. The DC power and current from the vehicle battery 82 is converted to AC power and current using the power inverter as known in the art and the voltage from the battery is stepped up to a high voltage (e.g. about 210 VDC to about 650 VAC) using the voltage converter as also known in the art. The vehicle battery 82 for the electric vehicle 14 propulsion may comprise any suitable battery electrodes and electrolytes, including those comprising lithium-ion and lithium-ion polymer batteries. The power electronics may be disposed in the selectively attachable and detachable hub motor 12, particularly the cylindrical stator 78, or elsewhere in the electric vehicle 14, including as a part of a vehicle controller 84, including the motor controller 86, or as part of the vehicle battery 82, or on a standalone basis. The electrical power, such as high voltage AC power, may be supplied to the selectively attachable and detachable hub motor 12 by any suitable electrical power and/or signal communication device 88, such as an electrical power bus 90 that comprises an electrical conductor configured to electrically communicate high voltage from the power electronics, which may be disposed as described herein, to the selectively attachable and detachable hub motor 12. The electric power for operation of the selectively attachable and detachable hub motor 12 must be communicated from the vehicle battery 82 through the electrical power and/or signal communication device 88, such as an electrical power bus 90, to a rotatable power coupling 94 that is configured to communicate the electrical power from the fixed elements of the vehicle, such as the non-rotatable axle 18 and the axle hub 32 to the reversibly rotatable cylindrical stator 78 and wheel 16. In one embodiment, the rotatable power coupling 94 comprises a rotatable slip ring connector 96, or a plurality of rotatable slip ring connectors 96, disposed between the wheel 16 that is rotatable and the cylindrical axle hub 32 that is fixed and is configured for electrical power communication from the vehicle controller 84, such as the motor controller 86, and the vehicle battery 82 to power and control the selectively attachable and detachable hub motor 12.

The motive wheel or wheels 10 comprising a selectively attachable and detachable hub motor or motors 12 may be operated in a driving mode where power from the vehicle battery 82 is applied to the selectively attachable and detachable hub motor 12 and used for electric vehicle 14 propulsion in a forward or reverse direction, a freewheeling mode where the selectively attachable and detachable hub motor is electrically disconnected from the battery, and a regenerative braking mode wherein a braking signal input from a vehicle controller 84 as is known in the art causes the motor controller 86 to command operation of the selectively attachable and detachable hub motor inner hub motor in a reverse direction (i.e. a direction of the motor opposite the then current direction of vehicle travel) which slows the vehicle in its current direction of operation and causes the motor to act as an electrical generator for generation of power for storage in the vehicle battery 82. In driving situations where regenerative braking in insufficient to provide sufficient stopping power for the vehicle, a vehicle controller 84, such as motor controller 86, may actuate the brake caliper 102 to provide additional stopping power from a mechanical friction brake 98 as described herein.

In one embodiment the motive wheel 10 comprising a selectively attachable and detachable hub motor 12 may also comprise a mechanical friction brake 98 that is configured to apply a mechanical braking force to the wheel 16 and selectively inflatable and deflatable tire 76 and selectively attachable and detachable hub motor 12, particularly the cylindrical stator 78, to slow the electric vehicle 14 when it is in motion, or to maintain the position of the vehicle when it is at rest. In one embodiment, the mechanical friction brake 98 comprises a cylindrical brake rotor 100 and a brake caliper 102. The cylindrical brake rotor 100 is configured for reversible rotatable disposition on and extending radially outwardly away from the non-rotatable axle 18 to a caliper portion 104. The cylindrical brake rotor 100 is also configured for attachment to the wheel hub 6. The brake caliper 102 comprises selectively movable opposed caliper legs 103 and is configured for attachment to the cylindrical axle hub 32 and the selectively movable opposed caliper legs 103 are configured to receive opposed selectively movable friction brake pads 106 disposed thereon. The opposed selectively movable opposed caliper legs 103 and selectively movable friction brake pads 106 are configured for pressed engagement against the caliper portion 104 to apply the mechanical braking force. The cylindrical brake rotor 100 is configured for selective attachment and detachment to the inner wheel surface 66 using an attachment device 108. Any attachment device 108 suitable for selective attachment and detachment of the cylindrical brake rotor 100 may be used, such as, for example, a plurality of threaded brake rotor fasteners 110, including threaded bolts or a combination of threaded studs and threaded nuts.

The cylindrical brake rotor 100 comprises a cylindrical ring and a caliper portion 104 that is configured for selective frictional engagement and friction braking of the electric vehicle 14 with selectively movable friction brake pads 106 of the brake caliper 102. The brake caliper 102 is configured for actuation as described herein to provide a braking action to the respective motive wheel 10. The brake caliper 102 is configured for selectively attachable and detachable attachment to the outer surface 33 of the cylindrical axle hub 32. The brake caliper 102 may be actuated to move the selectively movable friction brake pads 106 inwardly and compress them against the caliper portion 104 by any suitable actuator, including a hydraulic actuator (not shown) or an electrical actuator 112. Electrical actuator 112 may include any suitable electrical actuator, including an electric motor or an electric solenoid and may be in signal and power communication by brake power bus 114 with any suitable vehicle controller 84, such as motor controller 86, for example, that is configured for controlled application of power from a vehicle power source or battery, such as, for example, the vehicle battery 82 used for propulsion of the electric vehicle 14.

In one embodiment, the motive wheel 10 comprising the selectively attachable and detachable hub motor 12 also comprises an outer wheel cover 116 configured for disposition on the outer wheel surface 64 of the wheel 16 of the motive wheel 10 or the non-motive wheel 80 or an inner wheel cover 118 configured for disposition on the inner wheel surface 66 of the motive wheel 10 or the non-motive wheel 80. In one embodiment, the outer wheel cover 116 is configured to enclose the cylindrical rotor 46, the cylindrical stator 78, and the non-rotatable axle 18, and the inner wheel cover 118 is configured to enclose the cylindrical axle hub 32 and the mechanical friction brake 98, and more particularly the outer wheel cover 116 and inner wheel cover 118 may be configured to sealingly enclose these components and portions of the wheel 16 to exclude water, dirt, salt, and other contaminants. In one embodiment, the inner wheel cover 118 comprises flexible boot 120 disposed proximate the non-rotatable axle 18.

In one embodiment, a method 200 of making a motive wheel 10 comprising a selectively attachable and detachable hub motor 12 for an electric vehicle 14 is disclosed. The method 200 of making comprises forming 210 a non-rotatable axle 18 comprising an axle axis 26, an outer end 28, and a cylindrical axle hub 32 disposed inwardly from the outer end that extends radially outwardly away from the axle axis. The method 200 also comprises disposing 220 a wheel 16 on the non-rotatable axle 18 from the outer end 28, the wheel comprising an outer wheel surface 64, an inner wheel surface 66, a wheel hub 68 extending radially outwardly away from, and configured for reversible rotatable disposition on, the non-rotatable axle, and a wheel rim 69 attached to and circumferentially extending about the wheel hub, the wheel rim comprising an outer rim portion 70 that that extends axially away from the outer wheel surface and an inner rim portion 72 that extends axially away from the inner wheel surface, an outer rim surface 74 configured to receive a selectively inflatable and deflatable tire 76, the cylindrical axle hub disposed proximate the inner wheel surface and the inner rim portion. The method 200 also comprises attaching 230 a selectively attachable and detachable hub motor 12 to the wheel 16 and non-rotatable axle 18, the selectively attachable and detachable hub motor disposed proximate the outer wheel surface 64 and configured for selective attachment to and detachment from the wheel 16 and the non-rotatable axle 18, the selectively attachable and detachable hub motor comprising the concentrically disposed cylindrical rotor 46 and the cylindrical stator 78, the cylindrical rotor extending radially outwardly from, and configured for selective attachment to and detachment from, the non-rotatable axle, the cylindrical stator radially spaced from, and extending radially outwardly away from the cylindrical rotor, the cylindrical stator configured for selective attachment to and detachment from the wheel hub, the selectively attachable and detachable hub motor configured for reversible motive rotation of the wheel and cylindrical stator, wherein upon attachment of the selectively attachable and detachable hub motor a motive wheel 10 is provided, and wherein upon detachment of the selectively attachable and detachable hub motor a non-motive wheel 80 is provided. The method 200 may also comprise attaching 240 to the motive wheel 10 at least one of: a rotatable slip ring connector 96 that is configured for disposition between the wheel 16 and the cylindrical axle hub 32 and is configured for electrical power communication through an electrical power bus 90 from a vehicle controller 84 and a vehicle battery 82 to power and control the selectively attachable and detachable hub motor 12; a mechanical friction brake 98 that is configured to apply a mechanical braking force to the wheel 16 and selectively attachable and detachable hub motor 12; a stator spacer 67 disposed between the cylindrical stator 78 and the wheel hub 68; an outer wheel cover 116 configured for disposition on the outer wheel surface of the wheel 16 of the motive wheel 10 or the non-motive wheel 80, or an inner wheel cover 118 configured for disposition on the inner wheel surface 118 of the motive wheel 10 or the non-motive wheel 80; or an electric vehicle 14 comprising a plurality of motive wheels 10 and non-motive wheels 80.

In one embodiment, a method 300 of using a motive wheel 10 comprising a selectively attachable and detachable hub motor 12 for an electric vehicle 14 is disclosed. The method 300 of using comprises forming 310 a non-rotatable axle 18 comprising an axle axis 26, an outer end, and a cylindrical axle hub 32 disposed inwardly from the outer end that extends radially outwardly away from the axle axis; a wheel 16 comprising an outer wheel surface 64, an inner wheel surface 66, a wheel hub 68 extending radially outwardly away from, and configured for reversible rotatable disposition on, the non-rotatable axle, and a wheel rim 69 attached to and circumferentially extending about the wheel hub, the wheel rim comprising an outer rim portion 70 that that extends axially away from the outer wheel surface and an inner rim portion 72 that extends axially away from the inner wheel surface, an outer rim surface 74 configured to receive a selectively inflatable and deflatable tire 76, the cylindrical axle hub disposed proximate the inner wheel surface and the inner rim portion; and a selectively attachable and detachable hub motor 12 disposed proximate the outer wheel surface and configured for selective attachment to and detachment from the wheel and axle, the selectively attachable and detachable hub motor comprising a concentrically disposed cylindrical rotor 46 and a cylindrical stator 78, the cylindrical rotor extending radially outwardly from, and configured for selective attachment to and detachment from, the non-rotatable axle, the cylindrical stator radially spaced from, and extending radially outwardly away from, the cylindrical rotor and configured for selective attachment to and detachment from the wheel hub, the selectively attachable and detachable hub motor configured for reversible motive rotation of the wheel and cylindrical stator, wherein upon attachment of the selectively attachable and detachable hub motor a motive wheel 10 is provided, and wherein upon detachment of the selectively attachable and detachable hub motor a non-motive wheel 80 is provided. The method 300 of using also comprises installing 320 a plurality of first motive wheels 10 and first non-motive wheels 80 on a vehicle chassis 130 to form an electric vehicle 14, wherein the first motive wheels are configured to provide motive propulsion of the electric vehicle 14.

In one embodiment, the method 300 of using also comprises detaching 330 a first selectively attachable and detachable hub motor 12 from one of the first motive wheels 10, wherein the respective first motive wheel 10 becomes a second non-motive wheel 80; and attaching 340 the first selectively attachable and detachable hub motor 12 detached from the first motive wheel 10 to one of the first non-motive wheels 80 to provide a second motive wheel 80, wherein the position of the motive wheels 80 on the vehicle is moved from the outer wheel surface 64 of the respective motive wheel to the respective non-motive wheel and without removing the wheels from the electric vehicle.

In one embodiment of the method 300 of using, the plurality of motive wheels 10 comprises two motive wheels and the plurality of non-motive wheels 80 comprises two non-motive wheels, and the two motive wheels are front wheels 120 and the two non-motive wheels are rear wheels 122 and the electric vehicle is configured as an FWD vehicle, and wherein the selectively attachable and detachable hub motors are configured for detachment from the front wheels to make the front wheels non-motive wheels and attachment to the rear wheels to make the rear wheels motive wheels thereby reconfiguring the FWD vehicle to an RWD vehicle, or the two motive wheels are rear wheels and the two non-motive wheels are front wheels and the vehicle is configured as an RWD vehicle, and wherein the selectively attachable and detachable hub motors are configured for detachment from the rear wheels to make the rear wheels non-motive wheels and attachment to the front wheels to make the front wheels motive wheels thereby reconfiguring the RWD vehicle to an FWD vehicle.

In one embodiment of the method 300 of using, the plurality of motive wheels 10 comprises two motive wheels and the plurality of non-motive wheels 80 comprises two non-motive wheels, and the two motive wheels are front wheels or rear wheels and the two non-motive wheels are rear wheels or front wheels, respectively, and the vehicle is configured as an FWD vehicle or an RWD vehicle, respectively, and wherein the vehicle further comprises two additional selectively attachable and detachable hub motors that are configured for attachment to the respective non-motive wheels to convert the FWD vehicle or RWD vehicle, respectively, into an AWD or 4WD vehicle.

The terms "a" and "an" herein do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity). Furthermore, unless otherwise limited all ranges disclosed herein are inclusive and combinable (e.g., ranges of "up to about 25 weight percent (wt. %), more particularly about 5 wt. % to about 20 wt. % and even more particularly about 10 wt. % to about 15 wt. %" are inclusive of the endpoints and all intermediate values of the ranges, e.g., "about 5 wt. % to about 25 wt. %, about 5 wt. % to about 15 wt. %", etc.). The use of "about" in conjunction with a listing of items is applied to all of the listed items, and in conjunction with a range to both endpoints of the range. Finally, unless defined otherwise, technical and scientific terms used herein have the same meaning as is commonly understood by one of skill in the art to which this invention belongs. The suffix "(s)" as used herein is intended to include both the singular and the plural of the term that it modifies, thereby including one or more of that term (e.g., the metal(s) includes one or more metals). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments.

It is to be understood that the use of "comprising" in conjunction with the components or elements described herein specifically discloses and includes the embodiments that "consist essentially of" the named components (i.e., contain the named components and no other components that significantly adversely affect the basic and novel features disclosed), and embodiments that "consist of" the named components (i.e., contain only the named components).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A motive wheel comprising a selectively attachable and detachable hub motor for an electric vehicle, comprising:
   a non-rotatable axle comprising an axle axis, an outer end, and a cylindrical axle hub disposed inwardly from the outer end that extends radially outwardly away from the axle axis;
   a wheel comprising an outer wheel surface, an inner wheel surface, a wheel hub extending radially outwardly away from, and configured for reversible rotatable disposition on, the non-rotatable axle, and a wheel rim attached to and circumferentially extending about the wheel hub, the wheel rim comprising an outer rim portion that that extends axially away from the outer wheel surface and an inner rim portion that extend axially away from the inner wheel surface, an outer rim surface configured to receive a selectively inflatable and deflatable tire, the cylindrical axle hub disposed proximate the inner wheel surface and the inner rim portion; and
   a selectively attachable and detachable hub motor disposed proximate the outer wheel surface and configured for selective attachment to and detachment from the wheel and the non-rotatable axle, the selectively attachable and detachable hub motor comprising a cylindrical rotor and a cylindrical stator concentric with one another, the cylindrical rotor extending radially outwardly from, and configured for selective attachment to and detachment from, the non-rotatable axle, the cylindrical stator radially spaced from, and extending radially outwardly away from, the cylindrical rotor and configured for selective attachment to and detachment from the wheel hub, the selectively attachable and detachable hub motor configured for reversible motive rotation of the wheel and cylindrical stator, wherein upon attachment of the selectively attachable and detachable hub motor a motive wheel is provided, and wherein upon detachment of the selectively attachable and detachable hub motor a non-motive wheel is provided.

2. The motive wheel comprising a selectively attachable and detachable hub motor for an electric vehicle of claim 1, further comprising a rotatable slip ring connector that is configured for disposition between the wheel and the cylindrical axle hub and is configured for electrical power communication through an electrical power bus from a vehicle controller and a vehicle battery to power and control the selectively attachable and detachable hub motor.

3. The motive wheel comprising a selectively attachable and detachable hub motor for an electric vehicle of claim 1, wherein the cylindrical rotor is disposed in a cylindrical rotor housing and the cylindrical stator is disposed in a cylindrical stator housing, the cylindrical stator housing radially spaced from the cylindrical rotor housing, the cylindrical stator housing comprises a cylindrical ring and a circular rotor opening and the cylindrical rotor housing comprises a cylindrical ring disposed concentrically within the circular rotor opening.

4. The motive wheel comprising a selectively attachable and detachable hub motor for an electric vehicle of claim 1, wherein the cylindrical rotor is disposed in a cylindrical rotor housing and the cylindrical stator is disposed in a cylindrical stator housing, the cylindrical stator housing radially spaced from the cylindrical rotor housing.

5. The motive wheel comprising a selectively attachable and detachable hub motor for an electric vehicle of claim 1, further comprising a mechanical friction brake that is configured to apply a mechanical braking force to the wheel and the selectively attachable and detachable hub motor.

6. The motive wheel comprising a selectively attachable and detachable hub motor for an electric vehicle of claim 5, wherein the mechanical friction brake comprises a cylindrical brake rotor and a brake caliper, the cylindrical brake rotor configured for reversible rotatable disposition on and extending radially outwardly away from the non-rotatable axle to a caliper portion, the cylindrical brake rotor configured for selective attachment to and detachment from the wheel hub, the brake caliper configured for selectively attachable and detachable attachment to the axle hub and the selectively movable opposed caliper legs having opposed selectively movable friction brake pads disposed therebetween, the selectively movable opposed caliper legs and friction brake pads configured for pressed engagement against the caliper portion to apply the mechanical braking force.

7. The motive wheel comprising a selectively attachable and detachable hub motor for an electric vehicle of claim 1, wherein the non-rotatable axle comprises an independent axle configured for attachment to an independent vehicle suspension or a continuous axle configured for attachment to a vehicle suspension.

8. The motive wheel comprising a selectively attachable and detachable hub motor for an electric vehicle of claim 1, further comprising a stator spacer disposed between the cylindrical stator and the wheel hub.

9. The motive wheel comprising a selectively attachable and detachable hub motor for an electric vehicle of claim 1, further comprising an outer wheel cover configured for disposition on the outer wheel surface of the motive wheel or the non-motive wheel or an inner wheel cover configured for disposition on the inner wheel surface of a motive wheel or non-motive wheel.

10. The motive wheel comprising a selectively attachable and detachable hub motor for an electric vehicle of claim 1, further comprising a vehicle comprising a plurality of motive wheels and a plurality of non-motive wheels.

11. The motive wheel comprising a selectively attachable and detachable hub motor for an electric vehicle of claim 10, wherein the plurality of motive wheels comprises two motive wheels and the plurality of non-motive wheels comprises two non-motive wheels.

12. The motive wheel comprising a selectively attachable and detachable hub motor for an electric vehicle of claim 11, wherein the two motive wheels are front wheels and the two non-motive wheels are rear wheels and the electric vehicle is configured as a front wheel drive (FWD) vehicle, and wherein the selectively attachable and detachable hub motors are configured for detachment from the front wheels to make the front wheels non-motive wheels and attachment to the rear wheels to make the rear wheels motive wheels thereby reconfiguring the FWD vehicle to a rear wheel drive (RWD) vehicle.

13. The motive wheel comprising a selectively attachable and detachable hub motor for an electric vehicle of claim 11, wherein the two motive wheels are rear wheels and the two non-motive wheels are front wheels and the electric vehicle is configured as a rear wheel drive (RWD) vehicle, and wherein the selectively attachable and detachable hub motors are configured for detachment from the rear wheels to make the rear wheels non-motive wheels and attachment to the front wheels to make the front wheels motive wheels thereby reconfiguring the RWD vehicle to a front wheel drive (FWD) vehicle.

14. The motive wheel comprising a selectively attachable and detachable hub motor for an electric vehicle of claim 11, wherein the two motive wheels are front wheels or rear wheels and the two non-motive wheels are rear wheels or front wheels, respectively, and the electric vehicle is configured as a front wheel drive (FWD) vehicle or a rear wheel drive (RWD) vehicle, respectively, and wherein the electric vehicle further comprises two additional selectively attachable and detachable hub motors that are configured for attachment to the respective non-motive wheels to convert the FWD vehicle or RWD vehicle, respectively, into an all-wheel drive (AWD) vehicle.

15. A method of making a motive wheel comprising a selectively attachable and detachable hub motor for an electric vehicle, comprising:
 forming a non-rotatable axle comprising an axle axis, an outer end, and a cylindrical axle hub disposed inwardly from the outer end that extends radially outwardly away from the axle axis;
 disposing a wheel on the non-rotatable axle from the outer end, the wheel comprising an outer wheel surface, an inner wheel surface, a wheel hub extending radially outwardly away from, and configured for reversible rotatable disposition on, the non-rotatable axle, and a wheel rim attached to and circumferentially extending about the wheel hub, the wheel rim comprising an outer rim portion that that extends axially away from the outer wheel surface and an inner rim portion that extends axially away from the inner wheel surface, an outer rim surface configured to receive a selectively inflatable and deflatable tire, the cylindrical axle hub disposed proximate the inner wheel surface and the inner rim portion; and
 attaching a selectively attachable and detachable hub motor to the wheel and non-rotatable axle, the selectively attachable and detachable hub motor disposed proximate the outer wheel surface and configured for selective attachment to and detachment from the wheel and non-rotatable axle, the selectively attachable and detachable hub motor comprising a concentric cylindrical rotor and a cylindrical stator, the cylindrical rotor extending radially outwardly from, and configured for selective attachment to and detachment from, the non-rotatable axle, the cylindrical stator radially spaced from, and extending radially outwardly away from, the cylindrical rotor and configured for selective attachment to and detachment from the wheel hub, the selectively attachable and detachable hub motor configured for reversible motive rotation of the wheel and cylindrical stator, wherein upon attachment of the selectively attachable and detachable hub motor a motive wheel is provided, and wherein upon detachment of the selectively attachable and detachable hub motor a non-motive wheel is provided.

16. The method of making a motive wheel comprising a selectively attachable and detachable hub motor for an electric vehicle of claim 15, further comprising:
 attaching to the motive wheel at least one of:
 a rotatable slip ring connector that is configured for disposition between the wheel and the cylindrical axle hub and is configured for electrical power communication through an electrical power bus from a vehicle controller and a vehicle battery to power and control the selectively attachable and detachable hub motor;
 a mechanical friction brake that is configured to apply a mechanical braking force to the wheel and selectively attachable and detachable hub motor;
 a stator spacer disposed between the cylindrical stator and the wheel hub;
 an outer wheel cover configured for disposition on the outer wheel surface of a motive wheel or a non-motive wheel or an inner wheel cover configured for disposition on the inner wheel surface of a motive wheel or non-motive wheel; or
 an electric vehicle comprising a plurality of motive wheels and non-motive wheels.

17. A method of using a motive wheel comprising a selectively attachable and detachable hub motor for an electric vehicle, comprising:

forming a non-rotatable axle comprising an axle axis, an outer end, and a cylindrical axle hub disposed inwardly from the outer end that extends radially outwardly away from the axle axis; a wheel comprising an outer wheel surface, an inner wheel surface, a wheel hub extending radially outwardly away from, and configured for reversible rotatable disposition on, the axle, and a wheel rim attached to and circumferentially extending about the wheel hub, the wheel rim comprising an outer rim portion that that extends axially away from the outer wheel surface and an inner rim portion that extends axially away from the inner wheel surface, an outer rim surface configured to receive a selectively inflatable and deflatable tire, the cylindrical axle hub disposed proximate the inner wheel surface and the inner rim portion; and a selectively attachable and detachable hub motor disposed proximate the outer wheel surface and configured for selective attachment to and detachment from the wheel and axle, the selectively attachable and detachable hub motor comprising a concentric cylindrical rotor and a cylindrical stator, the cylindrical rotor extending radially outwardly from, and configured for selective attachment to and detachment from, the non-rotatable axle, the cylindrical stator radially spaced from, and extending radially outwardly away from, the cylindrical rotor and configured for selective attachment to and detachment from the wheel hub, the selectively attachable and detachable hub motor configured for reversible motive rotation of the wheel and cylindrical stator, wherein upon attachment of the selectively attachable and detachable hub motor a motive wheel is provided, and wherein upon detachment of the selectively attachable and detachable hub motor a non-motive wheel is provided; and installing a plurality of first motive wheels and first non-motive wheels on a vehicle chassis to form a wheeled vehicle, wherein the first motive wheels are configured to provide motive propulsion of the wheeled vehicle.

18. The method of using a motive wheel comprising a selectively attachable and detachable hub motor for an electric vehicle of claim 17, further comprising:

detaching a first selectively attachable and detachable hub motor from one of the first motive wheels, wherein the respective first motive wheel becomes a second non-motive wheel; and attaching the first selectively attachable and detachable hub motor detached from the first motive wheel to one of the first non-motive wheels to provide a second motive wheel, wherein a position of the motive wheels on the electric vehicle is moved from the outer wheel surface of the respective motive wheel to the respective non-motive wheel without removing either of the wheels from the electric vehicle.

19. The method of using a motive wheel comprising a selectively attachable and detachable hub motor for an electric vehicle of claim 17, wherein the plurality of first motive wheels comprises two first motive wheels and the plurality of first non-motive wheels comprises two first non-motive wheels, and wherein the two first motive wheels are front wheels and the two first non-motive wheels are rear wheels and the electric vehicle is configured as a front wheel drive (FWD) vehicle, and wherein the selectively attachable and detachable hub motors are configured for detachment from the front wheels to make the front wheels non-motive wheels and attachment to the rear wheels to make the rear wheels motive wheels thereby reconfiguring the FWD vehicle to a rear wheel drive (RWD) vehicle, or the two motive wheels are rear wheels and the two non-motive wheels are front wheels and the vehicle is configured as an RWD vehicle, and wherein the selectively attachable and detachable hub motors are configured for detachment from the rear wheels to make the rear wheels non-motive wheels and attachment to the front wheels to make the front wheels motive wheels thereby reconfiguring the RWD vehicle to an FWD vehicle.

20. The method of using a motive wheel comprising a selectively attachable and detachable hub motor for an electric vehicle of claim 17, wherein the plurality of first motive wheels comprises two first motive wheels and the plurality of first non-motive wheels comprises two first non-motive wheels, and wherein the two first motive wheels are front wheels or rear wheels and the two first non-motive wheels are rear wheels or front wheels, respectively, and the vehicle is configured as a front wheel drive (FWD) vehicle or a rear wheel drive (RWD) vehicle, respectively, and wherein the vehicle further comprises two additional selectively attachable and detachable hub motors that are configured for attachment to the respective non-motive wheels to convert FWD vehicle or RWD vehicle, respectively, into an all-wheel drive vehicle or a four wheel drive vehicle.

\* \* \* \* \*

UNITED STATES PATENT AND TRADEMARK OFFICE
CERTIFICATE OF CORRECTION

PATENT NO. : 11,440,398 B2
APPLICATION NO. : 16/588041
DATED : September 13, 2022
INVENTOR(S) : Joshua Payne and Nathan C. Westover It is certified that error appears in the above-identified patent and that said Letters Patent is hereby corrected as shown below:

In the Claims

In Claim 6, Column 17, Line 1 replace "the axle hub and the" with -- the cylindrical axle hub and --.

In Claim 15, Column 18, Line 29 replace "stator, the cylindrical rotor" with -- stator, the concentric cylindrical rotor --.

In Claim 15, Column 18, Lines 33-34 replace "from, the cylindrical rotor" with -- from, the concentric cylindrical rotor --.

In Claim 17, Column 19, Line 7 replace "the axle" with -- the non-rotatable axle --.

In Claim 17, Column 19, Line 19 replace "wheel and axel" with -- wheel and the non-rotatable axle --.

In Claim 17, Column 19, Line 26 replace "the cylindrical rotor" with -- the concentric cylindrical rotor --.

In Claim 18, Column 20, Line 2, replace "the first motive" with -- the respective first motor --.

In Claim 18, Column 20, Lines 7-8, replace "the wheels from" with -- the first motive wheels and the second motive wheels from --.

In Claim 19, Column 20, Lines 22-23, replace "the two motive wheels" with -- the two first motive wheels --.

In Claim 19, Column 20, Line 23, replace "the two non-motive wheels" with -- the two first non-motive wheels --.

In Claim 20, Column 20, Lines 38-39, replace "the vehicle" with -- the electric vehicle --.

Signed and Sealed this
Twenty-first Day of March, 2023

*Katherine Kelly Vidal*
Katherine Kelly Vidal
*Director of the United States Patent and Trademark Office*